Figure 1:
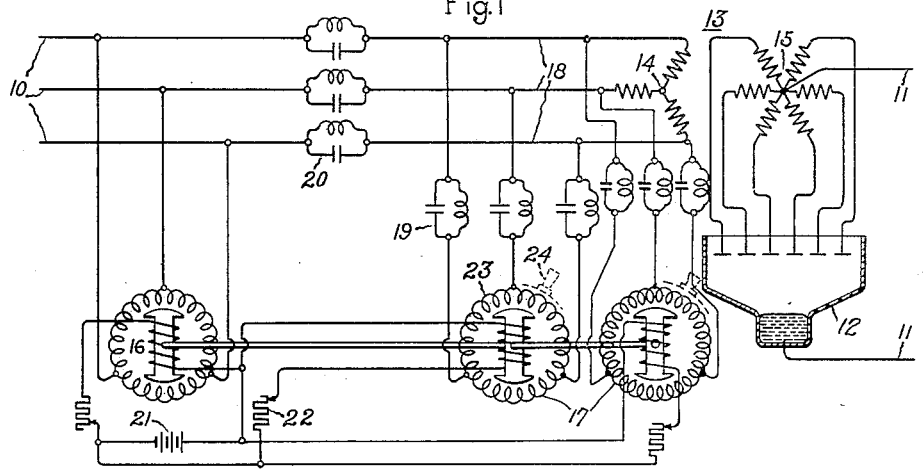

July 16, 1935.   W. PLATHNER ET AL   2,008,515
ELECTRIC SYSTEM
Filed July 30, 1931    2 Sheets-Sheet 1

Inventor:
Walter Plathner,
Karl Kettner,
by Charles V. Tullar
His Attorney.

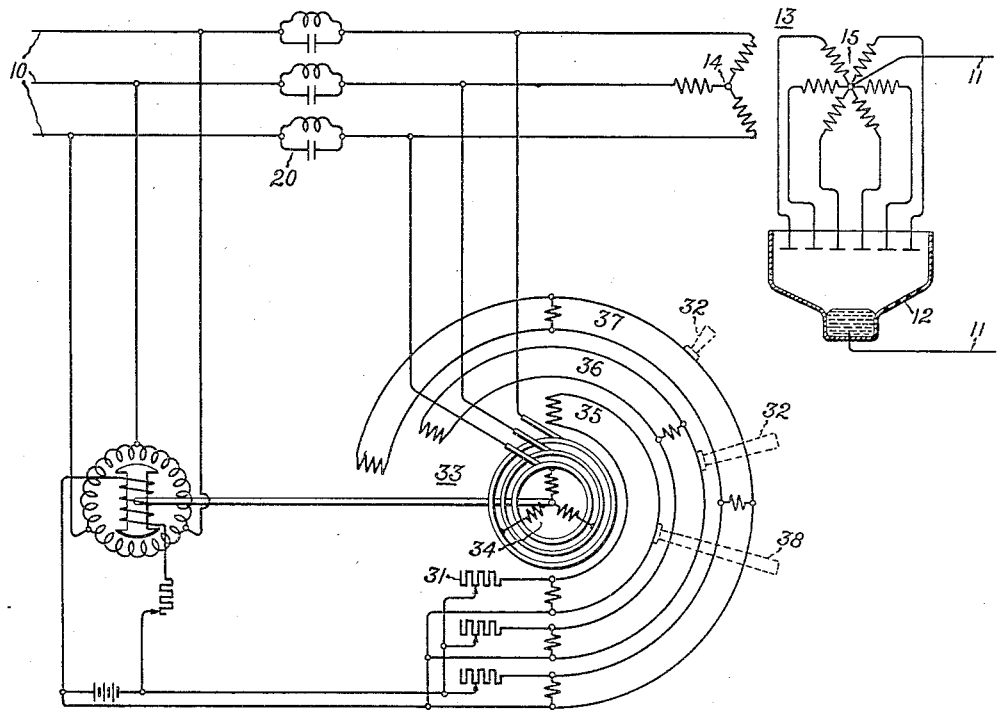

Patented July 16, 1935

2,008,515

UNITED STATES PATENT OFFICE 2,008,515

ELECTRIC SYSTEM

Walter Plathner, Berlin-Schoneweide, and Karl Kettner, Berlin, Germany, assignors to General Electric Company, a corporation of New York Application July 30, 1931, Serial No. 554,144
In Germany August 15, 1930

5 Claims. (Cl. 175—363)

Our invention relates to electric systems wherein power is transferred between alternating and direct current circuits by means of a space discharge device, such as a mercury arc rectifier connected to an alternating current circuit through a transformer, and has for its principal object the provision of improved methods and means for the elimination or reduction of disturbing harmonic voltages in the alternating current circuit due to harmonic components in the current passing through the space discharge device.

It is well known that the wave form of the current passing through a mercury arc rectifier supplied from an alternating current circuit characterized by a sine voltage wave differs from the sine form, the degree of departure from this form depending on the nature of the transformer connection employed. For example, if the transformer is arranged to supply a six-phase rectifier from a three-phase circuit, fifth and sixth harmonics of relatively large amplitude are generated, and if arranged to supply a twelve-phase rectifier an eleventh harmonic of relatively large amplitude is likewise generated.

These higher harmonics when permitted to flow in the alternating current three-phase supply circuit, which includes generating apparatus and a connecting network, disadvantageously modify and distort the wave form of the supply circuit voltage and, further, cause losses in the generating apparatus and leads of the supply circuit.

In accordance with our invention these disadvantages are obviated by providing the energy for generating the higher harmonics of the current passing through the rectifier directly at the point where these harmonics are to be used and supplying them to the transformer which is located at this point. Blocking means are provided in the alternating current supply circuit to prevent backflow of the harmonic currents into this supply circuit. The generating apparatus and leads of the alternating current network from which the current of fundamental frequency is supplied to the transformer are, therefore, not required to transmit the currents of harmonic frequency, and distortion of the wave form and losses in this supply circuit are avoided. The energy required for thus generating the higher harmonics by auxiliary apparatus is preferably derived from the three-phase supply circuit which supplies the fundamental.

Our invention will be better understood from the following description when considered in connection with the accompanying drawings and its scope will be pointed out in the appended claims.

Figure 2:
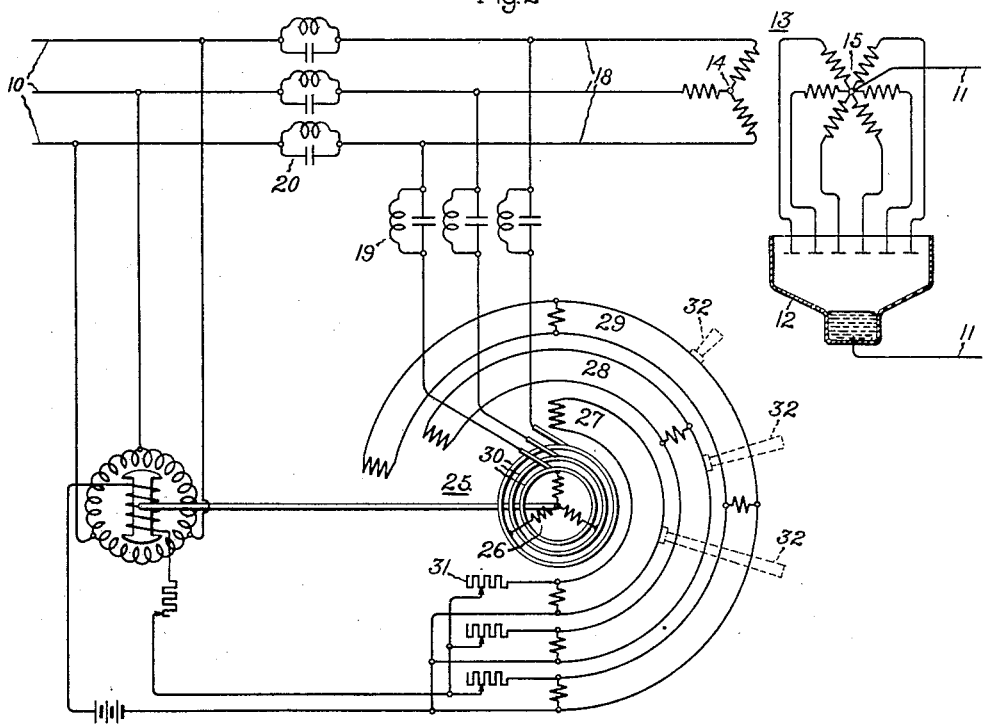

Referring to the drawings, Fig. 1 is a diagrammatic representation of an electrical system embodying our invention, and Figs. 2 and 3 are diagrammatic representations of modifications of the invention.

In Fig. 1, a three-phase alternating current circuit 10 is arranged to be connected to a direct current circuit 11 for the transfer of power therebetween through a space discharge device 12 connected to the alternating current circuit by means of a transformer 13 having, for example, a three-phase primary 14 and a six-phase secondary 15. In the embodiment of the invention shown in the figure the space discharge device 12 is a mercury arc rectifier arranged to rectify alternating current from a network including circuit 10 and alternating current generating apparatus (not shown) supplying to circuit 10 a voltage having preferably a substantially sine wave form.

In accordance with our invention, in order to provide the energy required for the production of the harmonic currents, for example the fifth and sixth, present in the current passing through the rectifier 12 a synchronous motor 16 connected to the three-phase circuit 10 is arranged to drive a plurality of synchronous generators 17, connected to the primary 14 of transformer 13 as by connection to a portion 18 of circuit 10 adjacent to transformer 13, a different one of the harmonic currents flowing through each of the generators 17 and primary 14 of transformer 13. Each generator 17 is provided with blocking means, as trap or rejector circuits 19, arranged to damp out undesired frequencies, particularly the fundamental frequency, supplied to the transformer by circuit 10, to prevent the flow of current of this fundamental or other undesired frequency into the generators 17 from the circuit 10. In order to prevent the harmonic currents flowing in transformer 13 and generators 17 from flowing back into the system comprising alternating current supply circuit 10, and thereby causing the above described wave distortion and losses therein, the circuit 10 is likewise provided with choke coils or other suitable means, such for example as trap or rejector circuits 20, arranged to block the currents of the harmonic frequencies or other frequencies flowing in generators 17 and transformer 13.

Excitation of the motor-generator system constituted by motor 16 and generators 17 is provided from a separate current source 21 or from the direct current output of rectifier 12.

The amplitude of the harmonics flowing in generators 17 and transformer 13 is regulated, as for example by adjusting the excitation of the generators 17 by means of a variable resistor 22 in the rotor circuit thereof, and likewise the phase position of the harmonics is adjusted as by angular movement of the stators 23 by means of a regulator element such as handle 24. The amplitude and phase of the harmonics flowing in transformer 13 and generator 17 are thereby regulated in a desired manner as required for given operational and load conditions in the rectifier system. It will be readily understood that such regulation may be effected automatically in response to load or other conditions.

In Fig. 2, in place of the plurality of generators 17 of Fig. 1 the generators through which flow the higher harmonics are combined in one machine, generator 25. This single machine comprises for example a rotating armature winding 26 and as many stationary field windings 27, 28, 29, each having its suitable number of poles, as the harmonic currents flowing in the transformer 13, the several harmonic currents flowing between from the armature 26 and the transformer 13 through slip rings 30. As in the embodiment of the invention illustrated in Fig. 1, the amplitude and phase of the harmonics are regulated respectively in accordance with operational and load conditions by means, for example, of variable resistors 31 and of handles 32 in operative relation with the angularly movable fields 27, 28, 29. The fundamental and other frequencies in circuit 10 are kept out of the circuits of the harmonic generating apparatus by blocking means 19 and the harmonics and other undesired frequencies flowing in transformer 13 and the harmonic generating apparatus are kept out of the circuit 10 by blocking means 20, in the same manner as in Fig. 1.

In Fig. 3 the plurality of harmonic generators shown in Fig. 1 are united in a single generator 33 similar to the generator 25 of Fig. 2, and including a rotating armature 34 and a plurality of field windings 35, 36, 37. In the embodiment of the invention illustrated in Fig. 3, however, one of the exciting field windings, in the present case winding 35, is arranged to generate currents of the fundamental frequency, i. e., of the fundamental supplied to transformer 13 by the alternating current circuit 10. The other exciting field windings 36, 37 are so arranged that in each there flows a different one of the harmonics flowing in the rectifier 12, in the same manner as hereinbefore described in connection with the embodiments of the invention illustrated in Figs. 1 and 2. The fields 36 and 37 in which the harmonics flow being preliminarily disconnected or otherwise made inoperative, the fundamental generated by field 35 of generator 33 is synchronized, by means above described such as handle 38 in operative relation with the angularly movable field, with the fundamental supplied to the transformer 13 by circuit 10. After this synchronizing operation is completed, the harmonic exciting fields 36, 37 are reconnected, whereby harmonics of desired amplitude and phase flow in the transformer, the back flow of harmonic currents to circuit 10 being prevented by the trap or rejector circuits 20 connected in the leads of circuit 10 and responsive to the harmonic frequencies. Since the fundamental is supplied to the transformer from the harmonic generator 33 as well as from the circuit 10, the fundamental frequency blocking means 19 of Figs. 1 and 2 between the harmonic generator and the circuit 10 are rendered unnecessary. In the embodiment of the invention illustrated in Fig. 3, therefore, the provision of the energy required for the generation of all of the harmonics flowing in the transformer is effected in one machine as in the embodiment illustrated in Fig. 2 and, further, the blocking means, represented for example by the trap or rejector circuit 19, required in the embodiments of Figs. 1 and 2 to prevent the flow of current of the fundamental frequency from circuit 10 into the circuits of the auxiliary generating apparatus are omitted from the system.

In the embodiments of the invention herein illustrated, the plurality of harmonics flowing in the rectifier 12 each flow in a different excitation circuit, for example, in the fields 23 of the separate generators 17 of Fig. 1, fields 27 to 29 of Fig. 2 and fields 36, 37 of Fig. 3, the amplitude and phase of the harmonics flowing in the plurality of excitation circuits being capable of regulation, while the rectifier system is in operation, to correspond to load or other conditions. It will be noted, however, that if a rectifier system is desired in which, after starting of the system, further adjustment of the harmonic currents to correspond with change of load is dispensed with and a preliminary optimum arrangement of the harmonic generating system to provide for a desired load is sufficient, all of the harmonics may then flow in a single excitation circuit, for example by the provision of suitable poles and winding pitch.

The harmonic generators 17, 25 and 33 have been described herein as connected directly to the primary 14 of transformer 13. It will be readily understood, however, that if the voltage of the three-phase circuit 10 supplying the fundamental frequency is relatively high, it is preferable to connect the harmonic generating apparatus to the three-phase circuit through suitable transformers, the inductance of these coupling transformers being conveniently utilized in providing the blocking means comprising the trap or rejector circuits 19.

What we claim as new and desire to secure by Letters Patent of the United States is:

1. In an electric system comprising an alternating current circuit, a direct current circuit, a space discharge device for voltage conversion between said alternating and direct current circuits, and a polyphase transformer interposed between said discharge device and said alternating current circuit, the current passing through said discharge device containing a plurality of harmonic currents tending to distort the voltage of said alternating current circuit, means to prevent said distortion including an auxiliary current generator having an armature connected to said transformer and a plurality of field windings, each of said field windings being adapted to induce in said armature a different one of said harmonic currents.

2. In an electric system comprising an alternating current circuit, a direct current circuit, a space discharge device for voltage conversion between said alternating and direct current circuits, and a polyphase transformer interposed between said discharge device and said alternating current circuit, the current passing through said discharge device containing a plurality of harmonic currents tending to distort the voltage of said alternating current circuit, means to prevent said distortion including an auxiliary generator having an armature connected to said transformer and a plurality of field windings, one of said field windings being adapted to induce in said armature a current of the fundamental frequency of said alternating current circuit, each of the others of said field windings being adapted to induce in said armature a different one of said harmonic currents, and means associated with said alternating current circuit and responsive to said harmonic currents to prevent the flow of said harmonic currents into said alternating current circuit.

3. In an electric system comprising an alternating current circuit characterized by a substantially sine wave voltage of fundamental frequency, a direct current circuit, a space discharge device for voltage conversion between said alternating and direct current circuits, and a polyphase transformer interposed between said discharge device and said alternating current circuit, the current passing through said discharge device containing a plurality of harmonics of said fundamental frequency tending to distort said sine wave voltage, said harmonics being produced by the action of said space discharge device, means to prevent said distortion including a plurality of synchronous generators connected to said transformer each adapted to produce a current of the same frequency as that of a different one of said harmonics and a synchronous motor connected to said generators and operated by current from said alternating current circuit at the fundamental frequency thereof, and means connected in said alternating current circuit responsive to said currents produced by said generators to block the flow of said harmonic currents into said alternating current circuit.

4. In an electric system comprising an alternating current circuit characterized by a substantially sine wave voltage of fundamental frequency, a direct current circuit, a space discharge device for voltage conversion between said alternating and direct current circuits, and a polyphase transformer interposed between said discharge device and said alternating current circuit, the current passing through said discharge device containing harmonics of said fundamental frequency tending to distort said sine wave voltage, said harmonics being produced by the action of said space discharge device, means to prevent said distortion including a plurality of synchronous generators connected to said transformer each adapted to produce a current of the same frequency as that of a different one of said harmonic currents and motor means associated with said alternating current circuit to operate said generators, means associated with each of said generators to adjust individually the amplitude and phase of each of said currents produced by said generators, and means connected in said alternating current circuit and responsive to said currents produced by said generators to block the flow of said currents produced by said generators into said alternating current circuit.

5. In an electric system comprising an alternating current circuit characterized by a substantially sine wave voltage of fundamental frequency, a direct current circuit, and a space discharge device for voltage conversion between said alternating and direct current circuits, the current passing through said discharge device containing harmonic currents tending to distort said sine wave voltage, said harmonic currents being produced by the action of said space discharge device, the method of preventing said distortion of said sine wave voltage which comprises generating currents of the same frequency respectively as that of said harmonic currents distinct from said alternating current circuit, transmitting said generated harmonic currents to said alternating current circuit, and preventing backflow of said independently generated harmonic currents into said alternating current circuit.

WALTER PLATHNER.
KARL KETTNER.